US012583403B2

(12) United States Patent
Ando

(10) Patent No.: US 12,583,403 B2
(45) Date of Patent: Mar. 24, 2026

(54) GROMMET

(71) Applicant: SUMITOMO WIRING SYSTEMS, LTD., Mie (JP)

(72) Inventor: Yusuke Ando, Mie (JP)

(73) Assignee: SUMITOMO WIRING SYSTEMS, LTD., Moe (JP)

( * ) Notice: Subject to any disclaimer, the term of this patent is extended or adjusted under 35 U.S.C. 154(b) by 181 days.

(21) Appl. No.: 18/563,991

(22) PCT Filed: May 20, 2022

(86) PCT No.: PCT/JP2022/020949

§ 371 (c)(1),
(2) Date: Nov. 24, 2023

(87) PCT Pub. No.: WO2022/255127

PCT Pub. Date: Dec. 8, 2022

(65) Prior Publication Data

US 2024/0425001 A1    Dec. 26, 2024

(30) Foreign Application Priority Data

Jun. 4, 2021    (JP) ................................. 2021-094664

(51) Int. Cl.
*B60R 16/00* (2006.01)
*B60R 16/02* (2006.01)

(52) U.S. Cl.
CPC ................................. *B60R 16/0222* (2013.01)

(58) Field of Classification Search
CPC .................................................. B60R 16/0222
See application file for complete search history.

(56) References Cited

U.S. PATENT DOCUMENTS

| | | | |
|---|---|---|---|
| 11,052,840 B2 * | 7/2021 | Cho | .................... B60R 16/0222 |
| 11,233,383 B2 * | 1/2022 | Robertson | ............ H02G 3/0456 |
| 2010/0314158 A1 * | 12/2010 | Suzuki | ..................... H02G 3/22 |
| | | | 174/152 G |

(Continued)

FOREIGN PATENT DOCUMENTS

| | | |
|---|---|---|
| JP | 2017-131056 A | 7/2017 |
| JP | 2017-158368 A | 9/2017 |

OTHER PUBLICATIONS

International Search Report issued on Jul. 12, 2022 for WO 2022/255127 A1 (4 pages).

*Primary Examiner* — Pete T Lee
(74) *Attorney, Agent, or Firm* — Venjuris, P.C.

(57) ABSTRACT

A grommet (10) according to an aspect of the present disclosure includes a grommet body (11) and a sound insulating wall (31). The grommet body (11) includes a first tubular portion (14) and a second tubular portion (21) configured to pass a wire harness (W) therethrough and a seal portion (12) configured to come into contact with a peripheral edge of an attachment hole (Pa). The grommet body (11) includes a first sound insulating space (S1) therein. The sound insulating wall (31) extends radially outward from the first tubular portion (14). The sound insulating wall (31) is configured to be capable of covering an insertion hole (41) in a sound insulating member (40) provided on one side surface of a vehicle body panel (P). The sound insulating wall (31) forms a second sound insulating space (S2) between the sound insulating wall (31) and the grommet body (11).

5 Claims, 3 Drawing Sheets

(56)     References Cited

U.S. PATENT DOCUMENTS

2017/0179703  A1      6/2017  Kominato et al.
2017/0349123  A1*  12/2017  Katoh  .................. H01B 17/583
2021/0129775  A1      5/2021  Ando

* cited by examiner

GROMMET

CROSS REFERENCE TO RELATED APPLICATIONS

This application is a national phase of PCT application No. PCT/JP2022/020949, filed on 20 May 2022, which claims priority from Japanese patent application No. 2021-094664, filed on 4 Jun. 2021, all of which are incorporated herein by reference.

TECHNICAL FIELD

The present disclosure relates to a grommet.

BACKGROUND

Conventionally, there is a grommet that is attached to an attachment hole extending through a vehicle body panel, which separates an interior space of a vehicle and the outside, and protects a wire harness passed through the attachment hole as disclosed in Patent Document 1, for example. Such a grommet is made of an elastic material such as rubber and configured to be capable of preventing water from entering between the attachment hole in the vehicle body panel and the wire harness.

PRIOR ART DOCUMENT

Patent Document

Patent Document 1: JP 2017-131056 A

SUMMARY OF THE INVENTION

Problems to be Solved

Incidentally, there are cases where a sound insulating member such as non-woven fabric, a rubber plate, a foaming material, or the like is attached to the vehicle body panel to increase sound insulating properties. In such a case, an insertion hole is provided in the sound insulating member at a position corresponding to the attachment hole in the vehicle body panel. A wire harness is passed through the attachment hole in the vehicle body panel and the insertion hole in the sound insulating member. However, there is a problem that sound leaks via the insertion hole in the sound insulating member.

An object of the present disclosure is to provide a grommet that can improve sound insulating properties.

Means to Solve the Problem

A grommet according to the present disclosure is configured to be attached to an attachment hole in a panel through which a wire harness is passed, the grommet including: a grommet body including a tubular portion configured to pass the wire harness therethrough and a seal portion configured to come into contact with a peripheral edge of the attachment hole; and a sound insulating wall extending radially outward from the tubular portion and configured to be capable of covering an insertion hole in a sound insulating member provided on one side surface of the panel, wherein the grommet body includes a first sound insulating space therein, and the sound insulating wall forms a second sound insulating space between the sound insulating wall and the grommet body.

Effect of the Invention

The grommet according to the present disclosure can improve sound insulating properties.

DETAILED DESCRIPTION TO EXECUTE THE INVENTION

Figure 1:
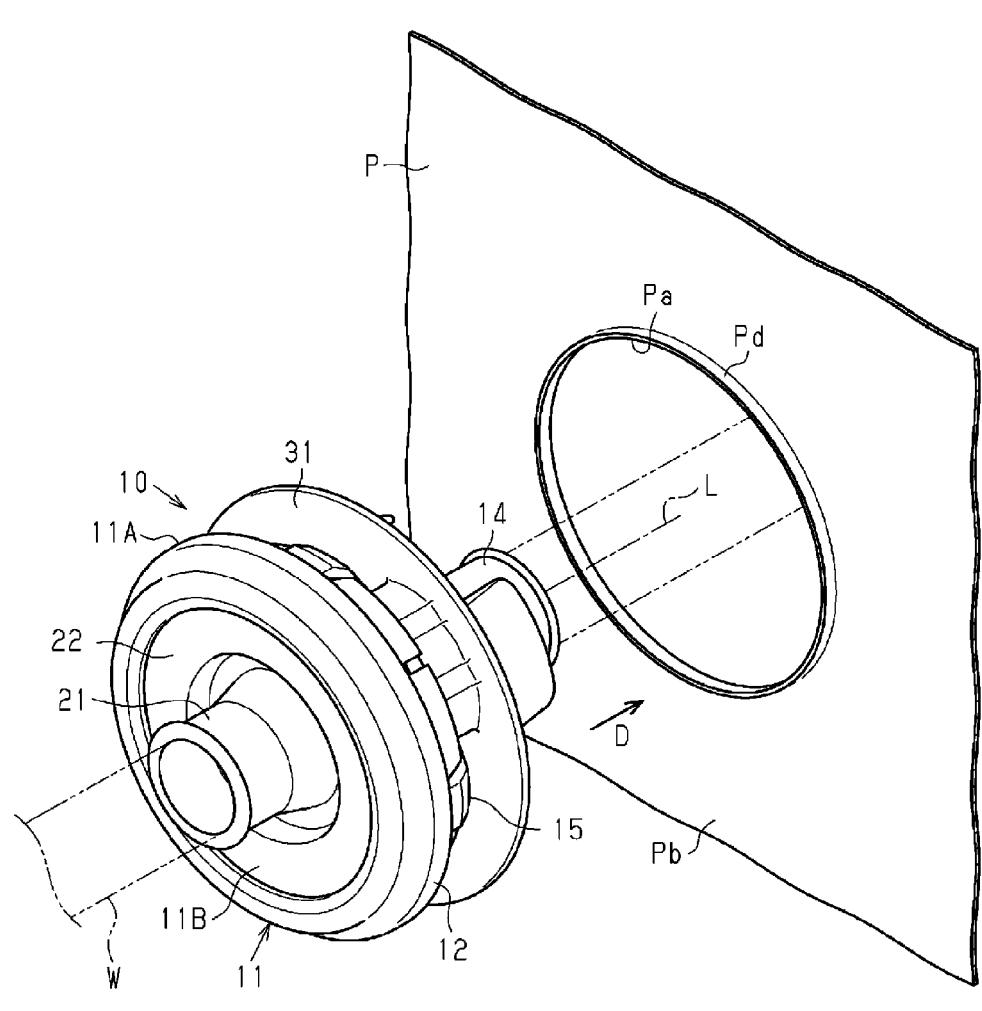
FIG. 1 is a perspective view of a grommet according to an embodiment.

Description of Embodiments of the Present Disclosure

First, embodiments of the present disclosure will be listed and described.

[1] A grommet according to the present disclosure is a grommet configured to be attached to an attachment hole in a panel through which a wire harness is passed, the grommet including: a grommet body including a tubular portion configured to pass the wire harness therethrough and a seal portion configured to come into contact with a peripheral edge of the attachment hole; and a sound insulating wall extending radially outward from the tubular portion and configured to be capable of covering an insertion hole in a sound insulating member provided on one side surface of the panel, wherein the grommet body includes a first sound insulating space therein, and the sound insulating wall forms a second sound insulating space between the sound insulating wall and the grommet body.

With this configuration, sound insulating properties can be improved by the first sound insulating space formed inside the grommet body and the second sound insulating space formed between the grommet body and the sound insulating wall.

[2] The grommet body includes a first wall portion and a second wall portion each provided between the tubular portion and the seal portion, the second wall portion is on an inner circumferential surface side of the seal portion that has a ring shape extending along the peripheral edge of the attachment hole, the first wall portion is between the second wall portion and the sound insulating wall, forms the first sound insulating space between the first wall portion and the second wall portion, and forms the second sound insulating space between the first wall portion and the sound insulating wall.

With this configuration, the sound insulating properties can be improved by the first sound insulating space formed between the first wall portion and the second wall portion of the grommet body and the second sound insulating space formed between the first wall portion and the sound insulating wall.

[3] The first wall portion, the second wall portion, and the sound insulating wall are spaced apart from each other in an axial direction of the tubular portion, and the first sound insulating space and the second sound insulating spaced are next to each other in the axial direction.

With this configuration, it is possible to arrange the first sound insulating space and the second sound insulating space of the grommet next to each other in an opening direction of the insertion hole in the sound insulating member. Accordingly, it is possible to insulate sound transmitted via the insertion hole between a vehicle interior space and the outside separated by the vehicle body panel, in a stepwise manner by the first sound insulating space and the second sound insulating space.

[4] The first wall portion and the sound insulating wall each extend from an outer circumferential surface of the tubular portion, and the second sound insulating space is formed around the outer circumferential surface of the tubular portion between the first wall portion and the sound insulating wall. In this configuration, it is possible to secure the second sound insulating space widely on the inner side in the radial direction by reducing the thickness of the tubular portion in the radial direction.

[5] The grommet body includes a first grommet and a second grommet, which are separate members, the first grommet including the first wall portion, and the second grommet including the second wall portion.

In this configuration, the first wall portion and the second wall portion, which form the first sound insulating space inside the grommet body, are respectively provided in the first grommet and the second grommet, which are separate members. Therefore, the first sound insulating space can be formed inside the grommet body through injection molding for which mold feasibility can be easily achieved.

[6] The first wall portion includes a recess in a side surface facing the sound insulating wall.

With this configuration, it is possible to secure the second sound insulating space widely between the first wall portion and the sound insulating wall by forming the recess in the side surface of the first wall portion facing the sound insulating wall.

Details of Embodiments of the Present Disclosure

The following describes a specific example of a grommet according to the present disclosure with reference to the drawings. In the drawings, a part of a configuration may be exaggerated or simplified for the sake of convenience of description. Dimensional ratios between parts may differ between the drawings. The term "orthogonal" used in the present specification encompasses not only orthogonal in a strict sense but also substantially orthogonal such that functions and effects according to the present embodiment can be achieved.

The term "tubular" used in descriptions in the present specification encompasses not only a shape formed by a peripheral wall that is continuous over the entire circumference but also a tubular shape formed by a plurality of components combined together and a shape that includes a cut part in the circumferential direction like a C-shape. Also, the "tubular" shape encompasses a circular shape, an elliptical shape, and a polygonal shape including angular or rounded corners. Also, the term "ring shape" used in descriptions in the present specification may refer to any structure forming a loop, a continuous shape that does not include an end portion, or a structure that includes a gap like a C-shape and is generally taken as a loop-shaped structure. Note that the "ring shape" encompasses a circular shape, an elliptical shape, and a polygonal shape including angular or rounded corners, but is not limited to these examples.

In the present specification, surfaces or members "facing each other" means that the surfaces or members are in front of each other, and encompasses not only a case where the surfaces or members are completely in front of each other but also a case where the surfaces or members are partially in front of each other. Also, in the present specification, two portions "facing each other" encompasses both a case where a member other than the two portions is between the two portions and a case where there is nothing between the two portions.

A grommet 10 shown in FIG. 1 is attached to an attachment hole Pa extending through a vehicle body panel P that separates an interior space of an automobile and the outside. The grommet 10 protects a wire harness W passed through the attachment hole Pa. The grommet 10 also has a function of securing waterproofness at the attachment hole Pa in the vehicle body panel P. Note that the wire harness W includes at least one electric wire. An axis L direction of the grommet 10 matches an insertion direction in which the wire harness W is passed through the grommet 10.

Figure 3:
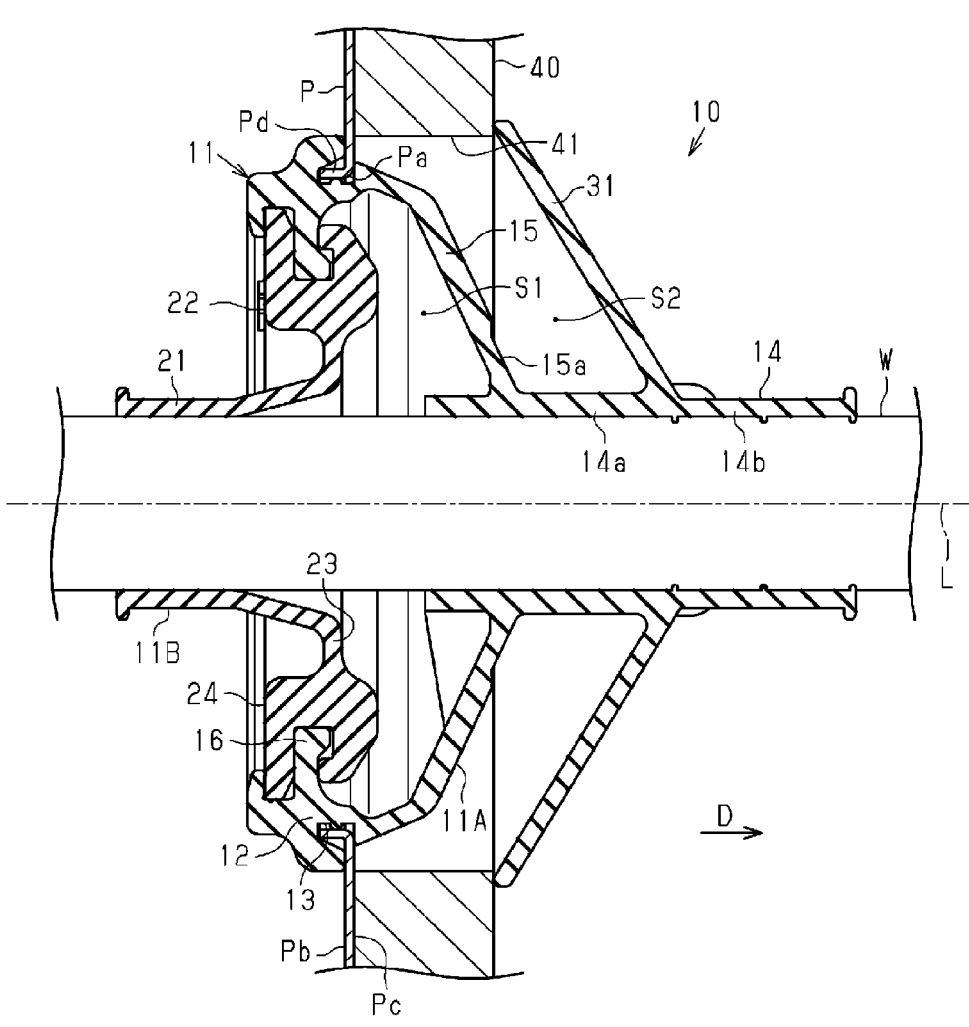
FIG. 3 is a cross-sectional view showing a state where the grommet according to the embodiment has been attached to a vehicle body.

As shown in FIGS. 1 and 3, the grommet 10 is inserted into the attachment hole Pa in the vehicle body panel P in an insertion direction D that extends along an axis L of the grommet 10. In the following description, the front side and the rear side in the insertion direction D of the grommet 10 may be simply referred to as the front side and the rear side, or the front side in the axis L direction and the rear side in the axis L direction, respectively. Also, in the following description, a circumferential direction about the axis L and a radial direction about the axis L may be simply referred to as a circumferential direction and a radial direction, respectively. In the state where the grommet 10 is attached to the attachment hole Pa, the front side in the insertion direction D is an interior side with respect to the vehicle body panel P, and the rear side in the insertion direction D is an exterior side with respect to the vehicle body panel P.

Note that a peripheral edge of the attachment hole Pa in the vehicle body panel P is subjected to so-called burring processing and bent in a thickness direction of the vehicle body panel P. In the present embodiment, a protrusion Pd protruding from a side surface Pb of the vehicle body panel P facing the exterior side is formed at the peripheral edge of the attachment hole Pa. That is, the protrusion Pd protrudes rearward from the peripheral edge of the attachment hole Pa in the insertion direction D. The protrusion Pd is bent to be substantially perpendicular to the side surface Pb of the vehicle body panel P.

As shown in FIG. 3, a sound insulating member 40 is attached to a side surface Pc of the vehicle body panel P. Non-woven fabric, a rubber plate, a foaming material, or the like can be used as the sound insulating member 40. An insertion hole 41 for passing the wire harness W therethrough is formed in the sound insulating member 40 at a position corresponding to the attachment hole Pa.

(Configuration of Grommet 10)

The grommet 10 includes a grommet body 11 and a sound insulating wall 31. The grommet 10 including the grommet body 11 and the sound insulating wall 31 is made of an elastic material such as rubber. Examples of the elastic material used for the grommet 10 include EPDM (ethylene propylene diene rubber). In the present embodiment, the sound insulating wall 31 and the grommet body 11 are formed as a single piece.

Figure 2:
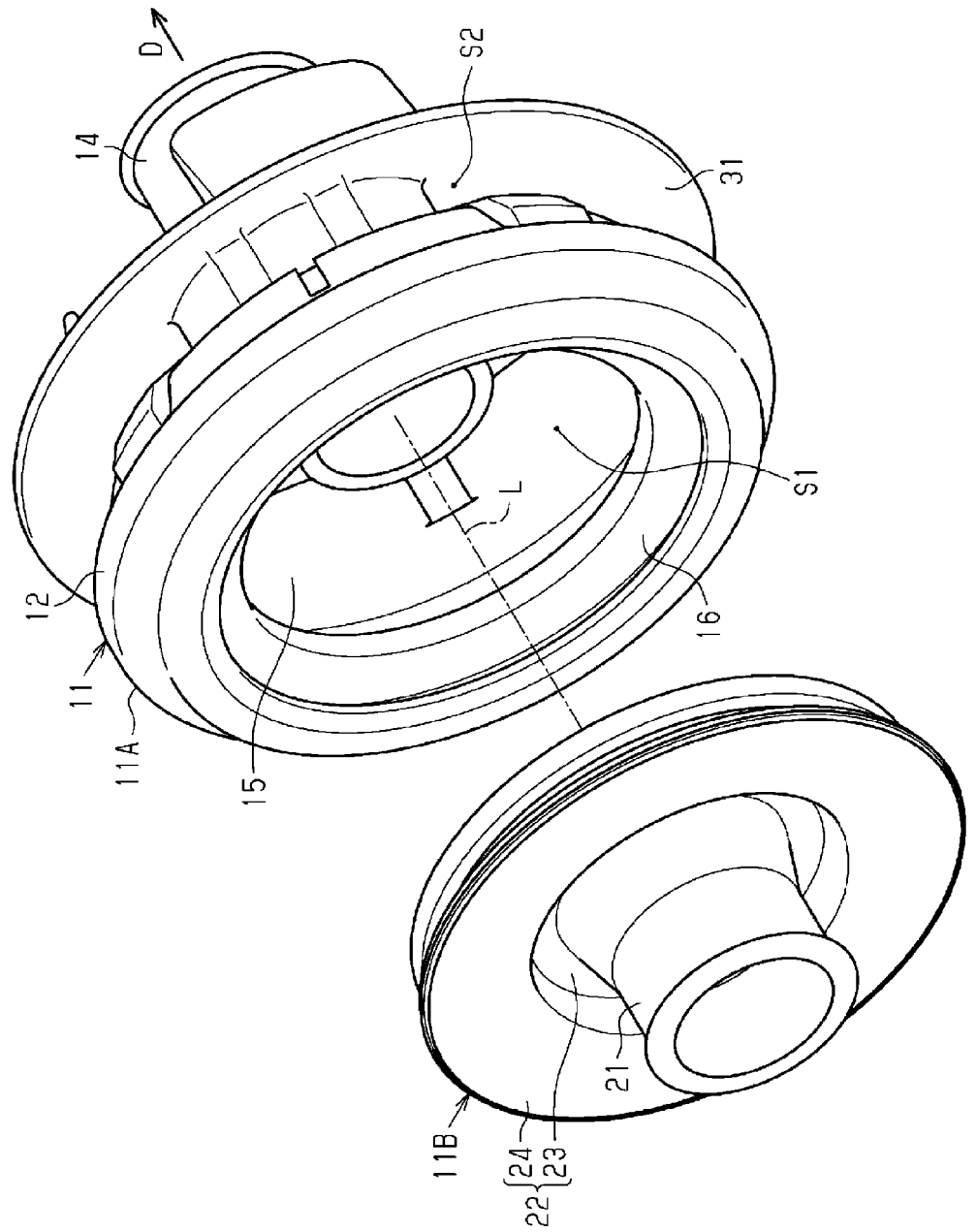
FIG. 2 is an exploded perspective view of the grommet according to the embodiment.

As shown in FIG. 2, the grommet body 11 is composed of two members separate from each other, for example. In the following description, one of the two members will be referred to as a "first grommet 11A" and the other will be referred to as a "second grommet 11B". Note that the first grommet 11A and the second grommet 11B may be made of the same elastic material or different elastic materials, but it is preferable that both are made of flexible elastic materials such as rubber.

(Grommet Body 11)

As shown in FIG. 3, the grommet body 11 includes a seal portion 12 in an outer circumferential edge portion. The grommet body 11 is the portion attached to the attachment hole Pa in the vehicle body panel P. The seal portion 12 in the present embodiment is formed in the first grommet 11A. The seal portion 12 has a ring shape having a center on the axis L. The seal portion 12 having the ring shape extends along the peripheral edge of the attachment hole Pa. The seal portion 12 includes an outer circumferential groove 13 in which the peripheral edge of the attachment hole Pa enters. The outer circumferential groove 13 is formed along the entire circumference of the seal portion 12 to have a ring shape having a center on the axis L. The outer circumferential groove 13 comes into close contact with the peripheral edge of the attachment hole Pa, and thus a space between the seal portion 12 and the attachment hole Pa is sealed in a liquid-tight manner.

(First Grommet 11A)

The first grommet 11A includes a first tubular portion 14 for passing the wire harness W therethrough, a first wall portion 15 extending radially outward from the first tubular portion 14, and the seal portion 12. A cross section of the first tubular portion 14 orthogonal to the axis L of the grommet 10 has a circular ring shape having a center on the axis L, for example. An axial direction of the first tubular portion 14 matches the axis L direction of the grommet 10. The wire harness W is passed through the first tubular portion 14 in a state where waterproofness is secured.

The first wall portion 15 has a tubular shape extending from an outer circumferential surface of the first tubular portion 14 in such a manner that the diameter increases rearward. When viewed in the axis L direction, the first wall portion 15 has a circular shape having a center on the axis L, for example. Also, the first wall portion 15 has a tapered shape whose diameter increases rearward in the axis L direction. The seal portion 12 is formed along an outer circumferential edge of an end portion of the first wall portion 15 having a large diameter. That is, the first wall portion 15 is between the first tubular portion 14 and the seal portion 12. Note that, in the present embodiment, the end portion of the first wall portion 15 having a large diameter is the rear end portion of the first wall portion 15 in the axis L direction.

The first grommet 11A includes a coupling piece 16 extending radially inward from an inner circumferential surface of the seal portion 12. The coupling piece 16 is formed along the entire circumference of the seal portion 12 to have a ring shape having a center on the axis L.

(Second Grommet 11B)

The second grommet 11B is attached to the first grommet 11A in such a manner as to close an opening in a rear end portion of the first grommet 11A. The second grommet 11B includes a second tubular portion 21 for passing the wire harness W therethrough and a second wall portion 22 extending radially outward from the second tubular portion 21.

A cross section of the second tubular portion 21 orthogonal to the axis L of the grommet 10 has a circular ring shape having a center on the axis L, for example. An axial direction of the second tubular portion 21 matches the axis L direction of the grommet 10. The wire harness W is passed through the second tubular portion 21 in a state where waterproofness is secured. The second tubular portion 21 has a diameter that is substantially the same as the diameter of the first tubular portion 14 of the first grommet 11A, for example.

The second wall portion 22 extends radially outward from a front end portion of the second tubular portion 21 like a flange, for example. When viewed in the axis L direction, the second wall portion 22 has a substantially circular shape, for example. The second wall portion 22 includes an extending portion 23 extending radially outward from the second tubular portion 21 and a coupling portion 24 provided along an outer circumferential edge of the extending portion 23.

The extending portion 23 connects the second tubular portion 21 and the coupling portion 24. The extending portion 23 is formed in a ring shape around the second tubular portion 21. The thickness of the extending portion 23 in the axis L direction is substantially equal to the thickness of the second tubular portion 21 in the radial direction. The extending portion 23 is flexible, and the second tubular portion 21 can move in the axis L direction relative to the coupling portion 24 due to flexibility of the extending portion 23.

The coupling portion 24 sandwiches the coupling piece 16 of the first grommet 11A in the axial direction. Thus, the coupling portion 24 and the coupling piece 16 are coupled and the second grommet 11B is fixed to the first grommet 11A.

The second wall portion 22 is provided in such a manner as to close the end portion of the first wall portion 15 having a large diameter. The second wall portion 22 is on the inner circumferential surface side of the seal portion 12. That is, the second wall portion 22 is between the second tubular portion 21 and the seal portion 12. The first wall portion 15 and the second wall portion 22 are spaced apart from each other in the axial direction of the first tubular portion 14 and the second tubular portion 21.

A first sound insulating space S1 is formed between an inner circumferential surface of the first wall portion 15 and the second wall portion 22 inside the grommet body 11. The first sound insulating space S1 spreads between the first wall portion 15 and the second wall portion 22 including the extending portion 23 and the coupling portion 24. Specifically, the first wall portion 15 and the coupling portion 24 face each other in the axis L direction via the first sound insulating space S1. Also, the first wall portion 15 and the extending portion 23 face each other in the axis L direction via the first sound insulating space S1. The first sound insulating space S1 also spreads between the coupling portion 24 and the inner circumferential surface of the seal portion 12, for example. By reducing the thickness of the coupling portion 24 in the axis L direction, it is possible to widen the first sound insulating space S1 and reduce the weight of the grommet 10.

(Sound Insulating Wall 31)

The sound insulating wall 31 and the first tubular portion 14 are formed as a single piece. The sound insulating wall 31 extends radially outward from the outer circumferential surface of the first tubular portion 14. The sound insulating wall 31 is on the front side in the axis L direction with respect to the first wall portion 15. The sound insulating wall 31 is configured to be capable of covering the insertion hole 41 in the sound insulating member 40 provided on the side surface Pc of the vehicle body panel P.

The sound insulating wall 31 has a tapered shape whose diameter increases rearward in the axis L direction, for example. Also, the sound insulating wall 31 has a circular shape having a center on the axis L, for example. In the state where the grommet 10 is attached to the vehicle body panel P, a peripheral edge portion of the sound insulating wall 31 elastically comes into contact with the sound insulating member 40. Thus, the sound insulating wall 31 covers the insertion hole 41 in the sound insulating member 40.

The sound insulating wall 31 is spaced apart from the first wall portion 15 of the grommet body 11 in the axial direction of the first tubular portion 14 and the second tubular portion 21. That is, the sound insulating wall 31 forms a second sound insulating space S2 between the sound insulating wall 31 and the first wall portion 15 of the grommet body 11. Note that, in the state where the grommet 10 is attached to the attachment hole Pa in the vehicle body panel P, an outer circumferential side of the second sound insulating space S2 is closed by an inner circumferential surface of the insertion hole 41.

Both the first wall portion 15 and the sound insulating wall 31 extend from the outer circumferential surface of the first tubular portion 14. The second sound insulating space S2 is formed around the outer circumferential surface of the first tubular portion 14 between the first wall portion 15 and the sound insulating wall 31. Here, as for the thickness of the first tubular portion 14 in the radial direction, the thickness of a portion 14a between the first wall portion 15 and the sound insulating wall 31 is set to be no greater than twice the thickness of a portion 14b that is on the front side with respect to the sound insulating wall 31. This configuration makes it possible to secure the second sound insulating space S2 widely on the inner side in the radial direction. Also, the first wall portion 15 includes a recess 15a in a side surface facing the sound insulating wall 31. The distance between the first wall portion 15 and the sound insulating wall 31 increases in the recess 15a. That is, the recess 15a makes it possible to secure the second sound insulating space S2 widely.

The first wall portion 15 is between the second wall portion 22 and the sound insulating wall 31 in the axial direction of the first tubular portion 14 and the second tubular portion 21. That is, the first sound insulating space S1 and the second sound insulating space S2 are next to each other in the axial direction of the first tubular portion 14 and the second tubular portion 21. In the present embodiment, in the state where the grommet 10 is attached to the attachment hole Pa, the axial direction of the first tubular portion 14 and the second tubular portion 21, i.e., the axis L direction of the grommet 10 substantially matches an opening direction of the insertion hole 41 in the sound insulating member 40. Therefore, the first sound insulating space S1 and the second sound insulating space S2 can be arranged next to each other in the opening direction of the insertion hole 41 in the sound insulating member 40.

Next, the following describes a manner of attachment of the grommet 10 to the attachment hole Pa.

First, the coupling piece 16 of the first grommet 11A is coupled to the coupling portion 24 of the second grommet 11B to obtain a single-piece component composed of the first grommet 11A and the second grommet 11B, and the single-piece component is inserted into the attachment hole Pa in the insertion direction D. At this time, the first wall portion 15 of the grommet body 11 is passed through the attachment hole Pa while deforming radially inward by coming into contact with the peripheral edge of the attachment hole Pa. Then, the peripheral edge of the attachment hole Pa enters the outer circumferential groove 13 in the seal portion 12 of the grommet body 11. In the state where the grommet body 11 is attached to the attachment hole Pa, a portion of the grommet body 11 is inside the insertion hole 41 in the sound insulating member 40.

The following describes effects of the present embodiment.

(1) The sound insulating properties at the insertion hole 41 in the sound insulating member 40 can be improved by the first sound insulating space S1 formed inside the grommet body 11 and the second sound insulating space S2 formed between the grommet body 11 and the sound insulating wall 31.

(2) The grommet body 11 includes the first wall portion 15 and the second wall portion 22 each provided between a tubular portion and the seal portion 12. The second wall portion 22 is on the inner circumferential surface side of the seal portion 12 having a ring shape extending along the peripheral edge of the attachment hole Pa. The first wall portion 15 is between the second wall portion 22 and the sound insulating wall 31, forms the first sound insulating space S1 between the first wall portion 15 and the second wall portion 22, and forms the second sound insulating space S2 between the first wall portion 15 and the sound insulating wall 31. With this configuration, the sound insulating properties at the insertion hole 41 in the sound insulating member 40 can be improved by the first sound insulating space S1 formed between the first wall portion 15 and the second wall portion 22 of the grommet body 11 and the second sound insulating space S2 formed between the first wall portion 15 and the sound insulating wall 31.

(3) The first wall portion 15, the second wall portion 22, and the sound insulating wall 31 are spaced apart from each other in the axial direction of the first tubular portion 14. The first sound insulating space S1 and the second sound insulating space S2 are next to each other in the axial direction of the first tubular portion 14. With this configuration, it is possible to arrange the first sound insulating space S1 and the second sound insulating space S2 of the grommet 10 next to each other in the opening direction of the insertion hole 41 in the sound insulating member 40. Accordingly, it is possible to insulate sound transmitted via the insertion hole 41 between the interior space and the outside separated by the vehicle body panel P, in a stepwise manner by the first sound insulating space S1 and the second sound insulating space S2.

(4) The first wall portion 15 and the sound insulating wall 31 each extend from the outer circumferential surface of the first tubular portion 14. The second sound insulating space S2 is formed around the outer circumferential surface of the first tubular portion 14 between the first wall portion 15 and the sound insulating wall 31. In this configuration, it is possible to secure the second sound insulating space S2 widely on the inner side in the radial direction by reducing the thickness of the first tubular portion 14 in the radial direction.

(5) The grommet body 11 includes the first grommet 11A and the second grommet 11B, which are separate members, the first grommet 11A includes the first wall portion 15, and the second grommet 11B includes the second wall portion 22. In this configuration, the first wall portion 15 and the second wall portion 22, which form the first sound insulating space S1 inside the grommet body 11, are separate members. Therefore, it is easy to form the first sound insulating space S1 inside the grommet body 11.

(6) It is possible to secure the second sound insulating space S2 widely between the first wall portion 15 and the sound insulating wall 31 by forming the recess 15*a* in the side surface of the first wall portion 15 facing the sound insulating wall 31.

The present embodiment can be modified as described below. The present embodiment and the following variations can be combined as long as no technical contradiction arises.

In the above embodiment, the sound insulating wall 31 and the first tubular portion 14 are formed as a single piece, but there is no limitation to this configuration, and the sound insulating wall 31 may be formed separately from the first tubular portion 14.

The configuration of the first wall portion 15 such as its shape is not limited to that in the above embodiment, and can be modified as appropriate according to the configuration of the grommet 10. For example, the recess 15*a* may be omitted from the first wall portion 15 in the above embodiment.

It is possible to adopt a coupling structure in which structures of the coupling piece 16 and the coupling portion 24 are interchanged. That is, it is possible to adopt a coupling structure in which a coupling portion included in the second grommet 11B is sandwiched by a coupling portion included in the first grommet 11A in the axis L direction.

The shape of the sound insulating wall 31 as viewed in the axis L direction is not limited to the circular shape, and can be changed as appropriate to an elliptical shape, a polygonal shape, or the like, for example.

The shape of the seal portion 12 as viewed in the axis L direction is not limited to the circular shape, and can be changed as appropriate to an elliptical shape or the like, for example, according to the shape of the attachment hole Pa.

The configuration of the grommet body 11 is not limited to that in the above embodiment, and can be modified as appropriate. For example, there is no limitation to the configuration in which the seal portion 12 is formed in the first grommet 11A, and the seal portion 12 may also be formed in the second grommet 11B. Also, in the above embodiment, the grommet body 11 is composed of the two components, i.e., the first grommet 11A and the second grommet 11B, but there is no limitation to this configuration, and the grommet body 11 may also be constituted by a single component.

In the above embodiment, the first sound insulating space S1 and the second sound insulating space S2 are next to each other in the axis L direction of the grommet 10, but another configuration is also possible in which the first sound insulating space S1 and the second sound insulating space S2 are next to each other in the radial direction of the grommet 10.

The elastic material used for the grommet 10 is not limited to EPDM, and NBR (acrylonitrile-butadiene rubber) or the like can also be used, for example.

In the present embodiment, the protrusion Pd provided along the peripheral edge of the attachment hole Pa protrudes toward the exterior side, but there is no limitation to this configuration, and a configuration is also possible in which the protrusion Pd protrudes toward the interior side. A configuration is also possible in which the grommet 10 is inserted from the interior side into the attachment hole Pa.

The protrusion Pd provided along the peripheral edge of the attachment hole Pa may be inclined relative to the axis L. A configuration is also possible in which the protrusion Pd is omitted from the attachment hole Pa (i.e., the attachment hole Pa is not subjected to the burring processing).

As shown in FIG. 3, the portion 14*a* of the first tubular portion 14 between the first wall portion 15 and the sound insulating wall 31 may have a uniform thickness, and a base end of the first wall portion 15 in the radial direction and a base end of the sound insulating wall 31 in the radial direction may be next to each other with a distance therebetween in the axial direction of the first tubular portion 14. A distal end of the first wall portion 15 in the radial direction may be in contact with the side surface Pc (the surface on the front side in the insertion direction D) of the vehicle body panel P, and a distal end of the sound insulating wall 31 in the radial direction may be in contact with a surface of the sound insulating member 40 that is on the front side in the insertion direction D.

As shown in FIG. 3, in the state where the distal end of the first wall portion 15 in the radial direction is in contact with the side surface Pc (the surface on the front side in the insertion direction D) of the vehicle body panel P, the length of the sound insulating wall 31 from its base end to its distal end in the radial direction may be set in such a manner that the distal end of the sound insulating wall 31 in the radial direction does not come into contact with the vehicle body panel P when the sound insulating member 40 has not been attached to the side surface Pc of the vehicle body panel P.

As shown in FIG. 3, the coupling portion 24 may be formed in a ring shape around the extending portion 23 and include the outer circumferential groove in which the coupling piece 16 enters. A protrusion protruding rearward in the insertion direction D may be formed at an outer edge of the coupling portion 24 in the radial direction, and a protrusion protruding forward in the insertion direction D and configured to engage with the protrusion included in the coupling portion 24 may be formed at an inner edge of the coupling piece 16 in the radial direction.

As shown in FIG. 3, the first grommet 11A may include a flange portion extending radially inward from the inner circumferential surface of the seal portion 12 on the rear side in the insertion direction D with respect to the coupling piece 16, and the flange portion may come into contact with the coupling portion 24 from the rear side in the insertion direction D.

The disclosed embodiment and variations are examples in all aspects, and the present invention is not limited to these examples. That is, the present invention is defined by the claims, and is intended to encompass all modifications within the meanings and scope that are equivalent to the claims.

LIST OF REFERENCE NUMERALS

10 Grommet
11 Grommet body
11A First grommet
11B Second grommet
12 Seal portion
13 Outer circumferential groove
14 First tubular portion (tubular portion)
14*a* Portion
14*b* Portion
15 First wall portion
15*a* Recess
16 Coupling piece
21 Second tubular portion (tubular portion)
22 Second wall portion
23 Extending portion
24 Coupling portion
31 Sound insulating wall
40 Sound insulating member
41 Insertion hole
D Insertion direction L Axis
P Vehicle body panel (panel)
Pa Attachment hole
Ph Side surface
Pc Side surface (one side surface)
Pd Protrusion
S1 First sound insulating space
S2 Second sound insulating space
W Wire harness

What is claimed is:

1. A grommet configured to be attached to an attachment hole in a panel through which a wire harness is passed, the grommet comprising:

a grommet body including a tubular portion configured to pass the wire harness therethrough and a seal portion configured to come into contact with a peripheral edge of the attachment hole; and a sound insulating wall extending radially outward from the tubular portion and configured to be capable of covering an insertion hole in a sound insulating member provided on one side surface of the panel, wherein the grommet body includes a first grommet including a first wall portion, a second grommet including a second wall portion, and a first sound insulating space therein, each of the first wall portion and the second wall portion being provided between the tubular portion and the seal portion, the sound insulating wall forms a second sound insulating space between the sound insulating wall and the grommet body, the second wall portion is on an inner circumferential surface side of the seal portion that has a ring shape extending along the peripheral edge of the attachment hole, the first wall portion is between the second wall portion and the sound insulating wall, forms the first sound insulating space between the first wall portion and the second wall portion, and forms the second sound insulating space between the first wall portion and the sound insulating wall, and the first grommet and the second grommet are separate members.

2. The grommet according to claim 1,
wherein the first wall portion, the second wall portion, and the sound insulating wall are spaced apart from each other in an axial direction of the tubular portion, and the first sound insulating space and the second sound insulating space are next to each other in the axial direction.

3. The grommet according to claim 1,
wherein the first wall portion and the sound insulating wall each extend from an outer circumferential surface of the tubular portion, and the second sound insulating space is formed around the outer circumferential surface of the tubular portion between the first wall portion and the sound insulating wall.

4. The grommet according to claim 1,
wherein the first wall portion includes a recess in a side surface facing the sound insulating wall.

5. The grommet according to claim 4,
wherein a portion of the first wall portion corresponding to the recess has a thickness less than a thickness of another portion of the first wall portion.

* * * * *